United States Patent [19]

Magara

[11] Patent Number: 5,233,147
[45] Date of Patent: Aug. 3, 1993

[54] WIRE-CUT ELECTRIC DISCHARGE MACHINE

[75] Inventor: Takuji Magara, Aichi, Japan

[73] Assignee: Mitsubishi Denki K.K., Tokyo, Japan

[21] Appl. No.: 872,369

[22] Filed: Apr. 23, 1992

[30] Foreign Application Priority Data

Jul. 1, 1991 [JP] Japan ................. 3-160332

[51] Int. Cl.$^5$ .............................................. B23H 7/04
[52] U.S. Cl. .................................. 219/69.12; 219/69.13
[58] Field of Search ............... 219/69.12, 69.13, 69.17, 219/69.18

[56] References Cited

U.S. PATENT DOCUMENTS

| | | | |
|---|---|---|---|
| 4,104,502 | 8/1978 | Ullmann et al. | 219/69.12 |
| 4,267,423 | 5/1981 | Bell, Jr. et al. | 219/69.13 |
| 4,339,650 | 7/1982 | Tanaka et al. | 219/69.12 |
| 4,366,359 | 12/1982 | Yatomi et al. | 219/69.17 |
| 4,392,041 | 7/1983 | Yatomi et al. | 219/69.12 |

FOREIGN PATENT DOCUMENTS

| | | | |
|---|---|---|---|
| 59-142021 | 8/1984 | Japan | . |
| 56-52129 | 5/1985 | Japan | 219/69.12 |
| 3-29531 | 4/1991 | Japan | . |

OTHER PUBLICATIONS

VDI-Zeitschrift, vol. 118, 1976, No. 1, Jan., pp. 13-17, Journal of the Society of German Engineering, Von Rudolf Panschow, "Effect of Forces Occurring in Spark-Erosive Cutting".

Primary Examiner—Geoffrey S. Evans
Attorney, Agent, or Firm—Sughrue, Mion, Zinn, Macpeak & Seas

[57] ABSTRACT

The wire-cut electric discharge machine controls the mean voltage or mean current detected in the detection circuit in response to the variation of the feed rate of the workpiece. The electrostatic attractive force and discharge repulsive force act to the workpiece and make a balance. As a result, the arcuate shape distortion is canceled.

20 Claims, 10 Drawing Sheets

FIG. 5(a) WORKPIECE THICKNESS
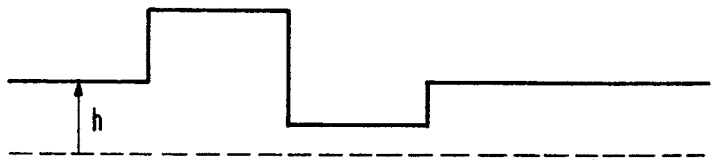
FIG. 5(b) MEAN VOLTAGE V
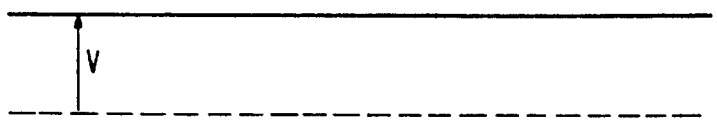
FIG. 5(c) FEED RATE (REMOVAL RATE)
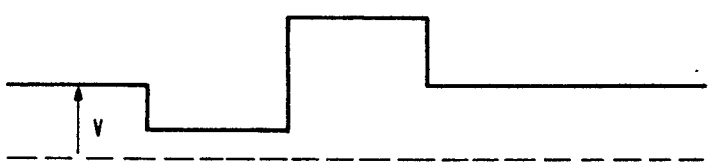
FIG. 5(d) MEAN CURRENT I
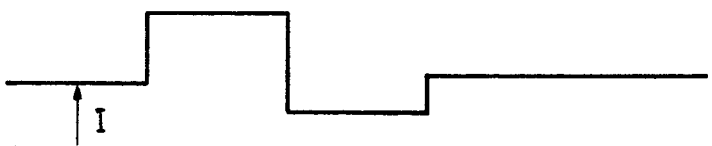
FIG. 5(e) WIRE DISTORTION VOLUME $\delta 1$ IN RESPONSE TO ELECTROSTATIC FORCE f1
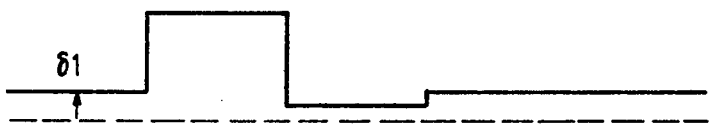
FIG. 5(f) WIRE DISTORTION VOLUME $\delta 2$ IN RESPONSE TO DISCHARGE REPULSIVE FORCE f2
FIG. 5(g) TOTAL DISTORTION $\Delta = \delta 1 - \delta 2$

FIG. 6(a) WORKPIECE THICKNESS
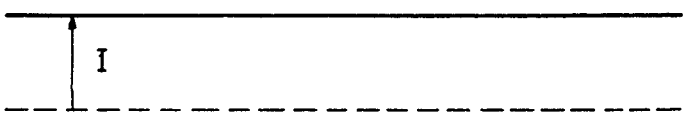
FIG. 6(b) MEAN CURRENT I
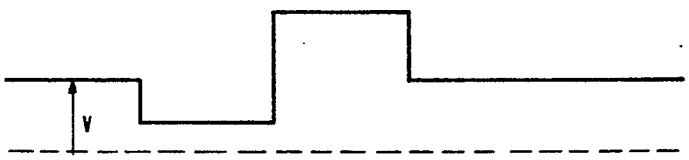
FIG. 6(c) FEED RATE (REMOVAL RATE)
FIG. 6(d) MEAN VOLTAGE V
FIG. 6(e) WIRE DISTORTION VOLUME $\delta 1$ IN RESPONSE TO ELECTROSTATIC FORCE f1
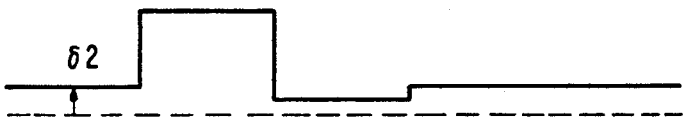
FIG. 6(f) WIRE DISTORTION VOLUME $\delta 2$ IN RESPONSE TO DISCHARGE REPULSIVE FORCE F2
FIG. 6(g) TOTAL DISTORTION $\Delta = \delta 1 - \delta 2$

OUTER CORNER

INNER CORNER

CONCAVE SHAPE

CONVEX SHAPE

CONCAVE SHAPE

CONVEX SHAPE

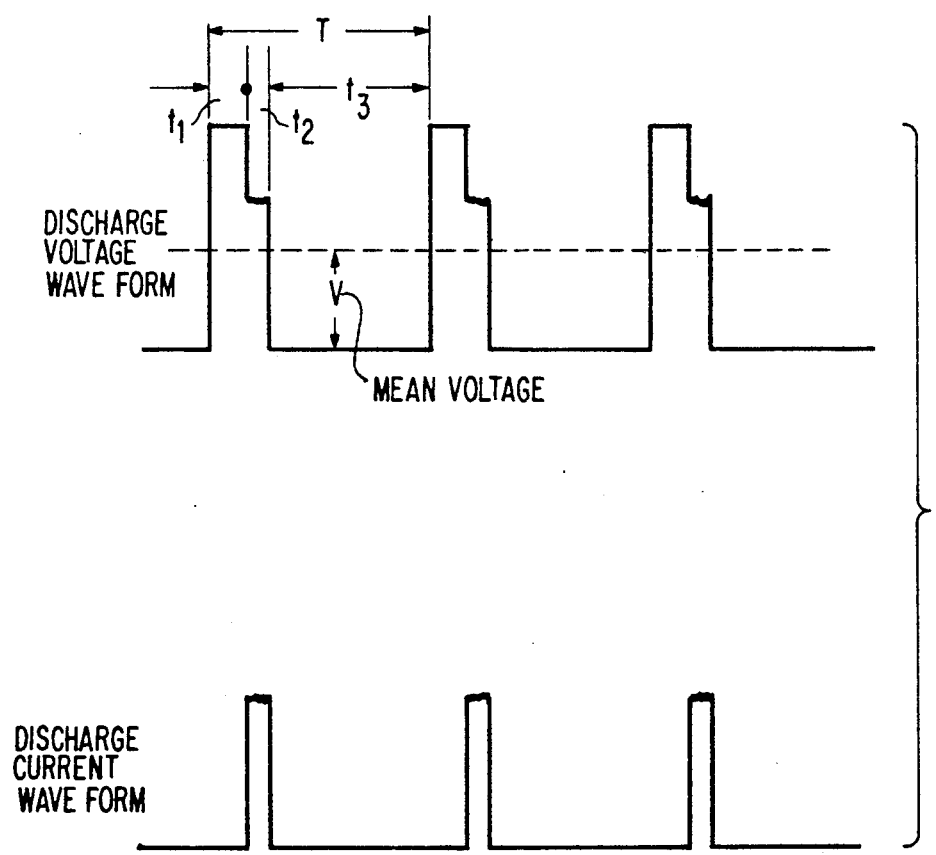

CONSTANT MEAN VOLTAGE

CONSTANT MEAN CURRENT

WIRE-CUT ELECTRIC DISCHARGE MACHINE

BACKGROUND OF THE INVENTION

The invention relates to a high precision wire-cut electric discharge machine. More particularly, the invention concerns a wire-cut electric discharge machine for preventing the occurrence of an arcuate shape on a cutting surface of a workpiece by controlling the discharge repulsive force and the electrostatic attractive force generated between a wire electrode and the workpiece so as to have the two forces cancel out each other.

In the conventional wire-cut electric discharge machine, an arcuate shape is generated on the surface of the workpiece during finish machining. The arcuate shape has a degraded working precision. The arcuate shape is a characteristic phenomenon generated in the wire-cut electric discharge machine and also is considered a serious problem.

FIG. 9a shows a concave arcuate shape, and FIG. 9b shows a convex arcuate shape. The arcuate shape and its volume depends on the working condition and workpiece thickness.

The construction and operation of the conventional machine will be hereinafter described.

FIG. 8 shows a construction of the conventional wire-cut electric discharge machine. In FIG. 8, a wire electrode 1 provides one electrode of the electric discharge machine. A workpiece 2 is a material processed by wire-cut electric discharge machine. A wire bobbin 3 provides a wire which is constructed to act as a wire electrode. Upper nozzle 4a and lower nozzle 4b provide dielectric working fluid into a discharge gap. Power supply terminals 5 are in electrical contact with the wire electrode and provide the working voltage and working current that is supplied at the gap. A tension roller 6 gives tension to the wire electrode 1. A wire collecting box 7 collects the wire. A working power source 8 provides current which flows within the discharge gap constructed of the wire electrode 1 and the workpiece 2. A voltage detection circuit 9 detects the mean voltage value at the discharge gap. A control circuit 10 controls the feed rate of the workpiece 2 according to the result of the mean voltage detection circuit 9. A servo amplifier 11 drives a driving motor apparatus 12. A driving motor 12 causes the workpiece 2, mounted on the X-Y cross table (not shown), to be moved in the X and Y directions.

The operation of the conventional machine will be hereinafter described with reference to FIG. 8. A discharge gap is formed between the workpiece 2 and the wire electrode 1. The wire electrode 1 runs through the gap under the tension applied by the tension roller 6, and a working current is supplied to the wire electrode 1 from the working power source 8 through power supply terminals 5. Pure water provided as the working fluid is supplied into the discharge gap from upper side and lower side through working fluid nozzles 4a, 4b. The pure water causes the generation of a discharge phenomenon in the gap, between the wire electrode and the grounded workpiece.

The voltage detection circuit 9 connected to the discharge electrode 1 and workpiece 2 detects the mean voltage that appears during a machining of the workpiece. The control circuit 10 is responsive to the voltage detection circuit 9 and controls the feed rate of the workpiece 2 so that the detected voltage is maintained to be a predetermined value.

Specifically where there is a higher mean voltage as compared to the predetermined voltage, this shows that there exists a larger discharge gap distance than a predetermined value. Therefore the control circuit 10 controls the servo amplifier 11 so that the driving motor 12 increases the feed rate. When the feed rate is increased the discharge gap distance becomes smaller.

Conversely, where there is a lower mean voltage than a predetermined voltage, this shows that there is a smaller discharge gap distance than the predetermined value. Therefore the control circuit 10 controls the servo amplifier 11 so that the driving motor decreases the feed rate. When the feed rate decreases the discharge gap becomes larger. Namely, the control circuit 10 controls the discharge gap to be constant.

FIG. 11 shows the connection between the discharge voltage wave form and the discharge current wave form. As shown in the figure, high discharge voltage is applied to the gap during on-time $t_1$. After the gap insulation breaks down, discharge current flows during $t_2$, and then the discharge ceases during off-time $t_3$. The period T of the discharge voltage is expressed such as $T = t_1 + t_2 + t_3$. In the figure, mean voltage V is obtained by equalizing the discharge voltage for one or more periods.

In general, very precise machining (second cut) is carried out after rough machining (first cut). During the precise machining, arcuate shape error which is a characteristic phenomenon occurring in wire-cut machining, is generated on the surface of the workpiece.

FIGS. 10(a) and 10(b) show a typical arcuate shape that has been measured on the surface of a workpiece after precise machining. The straight line shows the expected value with no error and the polygonal line shows the result of an actual measurement. From the figures it is understood that the working error is larger at the center of the workpiece.

There are many theories in connection to the cause of the arcuate shape. One of the theories states that the working error occurs from the vibration of the wire electrode. Another theory states that the error is generated in response to a resistivity decrement, caused by discharge ionization at the center of the gap, as the working fluid is supplied to the workpiece from the upper side and the lower side. But these two theories do not provide enough information to permit the development of an effective solution for the arcuate shape.

On the other hand, regarding the problem of wire electrode distortion and deterioration of working precision, Japanese patent publication 29513/1991 describes a method which cancels a discharge repulsive force by intentionally generating an electrostatic attractive force and an electromagnetic force between the wire electrode and the workpiece during a rough cut machining operation. But in the above method, a signal compensation circuit is necessary for the wire-cut electric discharge machine in addition to the work power source.

As stated above, according to the conventional wire-cut electric discharge machine, there is no effective method to prevent the generation of the arcuate shape during finish machining.

Further, the arcuate shape and its volume are changed according to the machining condition and workpiece thickness. Thus, when the workpiece thickness changes during machining, it has been found that the arcuate shape will always occur on the surface of the workpiece. Therefore, it is very difficult to maintain high precise condition for machining in the conventional discharge machine.

In the method disclosed in the Japanese patent publication 29513/1991, the distortion of the wire electrode during rough machining was decreased by applying a compensation signal between the upper and lower electrode or between wire electrode and workpiece. But, since the disclosed method could control the electrostatic attractive force and electromagnetic force only toward the increasing direction, it is impossible to decrease the concave arcuate shape generated in the finish machining.

SUMMARY OF THE INVENTION

It is a primary object of the present invention to provide a wire-cut electric discharge machine comprising: a working power source for providing discharge current, a voltage detection circuit for detecting the mean voltage between the electrodes, a current detection circuit detecting the mean current of the discharge current, a control circuit for controlling the off time of the discharge voltage or discharge current. The control circuit controls the discharge current such that the current detection circuit decreases the mean current according to an increase in the feed rate when the feed rate is controlled so that the mean voltage becomes constant. Also, the control circuit controls the discharge voltage such that the voltage detection circuit decreases the mean current according to an increase in the feed rate when the feed rate is controlled so that the mean current becomes constant.

BRIEF DESCRIPTION OF THE DRAWING

FIGS. 5(a)-(g) show the dynamic characteristics of some portion of the wire electric discharge machine when the workpiece thickness is changing on the condition of constant mean voltage.

FIGS. 6(a)-(g) show the dynamic characteristics of some portion of the wire electric discharge machine when the workpiece thickness is changing on the condition of constant mean current.

FIG. 11 shows the connection between the discharge voltage wave form and the discharge current wave form.

DETAILED DESCRIPTION OF THE PREFERRED EMBODIMENTS

A cause of the arcuate shape during a machining operation is described hereinafter before the embodiment of the present invention is described.

As described above, there are two main theories that attempt to explain the generation of the arcuate shape on the working piece. One is the "vibration theory" which states that the arcuate shape is generated by the wire electrode vibration, and another is the "resistivity theory" which states that the arcuate shape is caused when the resistivity caused by discharge ionization decreases at the center of the gap.

But these two theories have some questionable points. For example:

(1) Wire vibration theory:

(a) According to the actual vibration measurement, under a slow feed rate during the rough machining, low mode vibration occurs in the wire-electrode 1, but in the finish machining the vibration of the wire electrode 1 becomes random and its amplitude is comparatively small.

(b) It is difficult to explain the generation process of the convex arcuate shape during finish machining at a comparatively high feed rate.

(2) Resistivity theory:

(a) The arcuate shape is generated even if kerosene is used as the machining liquid, which has no significant decrease of resistivity.

(b) The arcuate shape is generated even if a high frequency alternating current power source is used even though for such power source an electrolytic action is not generated.

As described above, the prior theories can not explain the generation of arcuate shape.

Studies reported in the Germany Technical Journal VDI-Zeitschrift, 1976, Vol. 118, No. 1 pp 13-17, have described that there are forces that act on the wire electrode according to (1) electrolytic action, (2) electromagnetic field, (3) spark discharge or (4) dielectric bubble formation, during discharge machining. Further according to the present invention, it is believed that the electrostatic force between wire electrode and workpiece mostly influences the generation of the arcuate shape. The following is the explanation of the theory underlying the method of the present invention.

Figure 2:
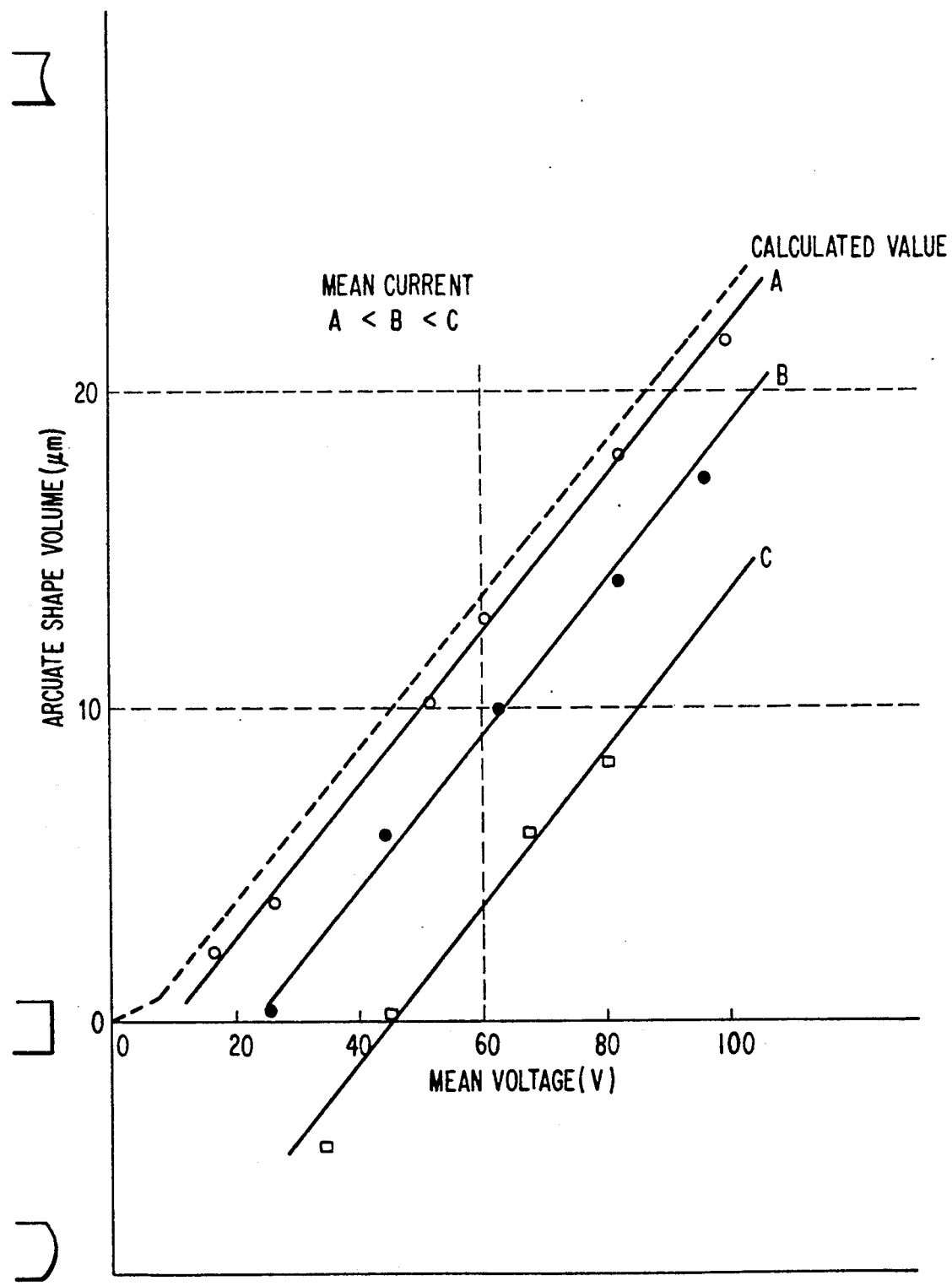
FIG. 2 shows relationship between the mean voltage and the arcuate shape.

FIG. 2 shows a relationship between the mean voltage and the arcuate shape for three values of current (A,B,C). From FIG. 2, it is apparent that there is a linear relation between the mean voltage V and the arcuate shape volume $\delta$. Especially, according to the line (A) where the mean current I is small, the concave error is proportional to the mean voltage V. It is thought that the volume of concave shape depends on the electrostatic force between wire electrode 1 and workpiece 2.

Figure 3:
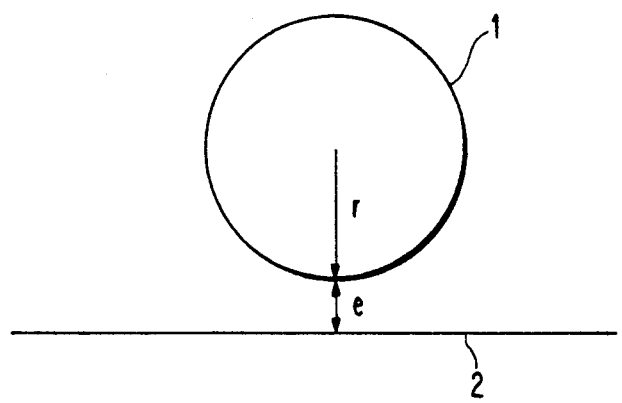
FIG. 3 explains the discharge attractive force between wire electrode and workpiece.

FIG. 3 explains the discharge attractive force between a wire electrode 1 and a workpiece 2. Using an electric image method, electrostatic attractive force $f_1$ per unit length in the discharge gap is calculated as follows:

$$f_1 = (\tfrac{1}{2})\pi\epsilon_0 V^2/2(r+e)\{\log 2[r+e]/r\} \qquad (1)$$

where, $\epsilon_0$: dielectric constant, V: discharge voltage between electrodes, r: wire electrode radius, e: discharge gap distance.

Figure 4:
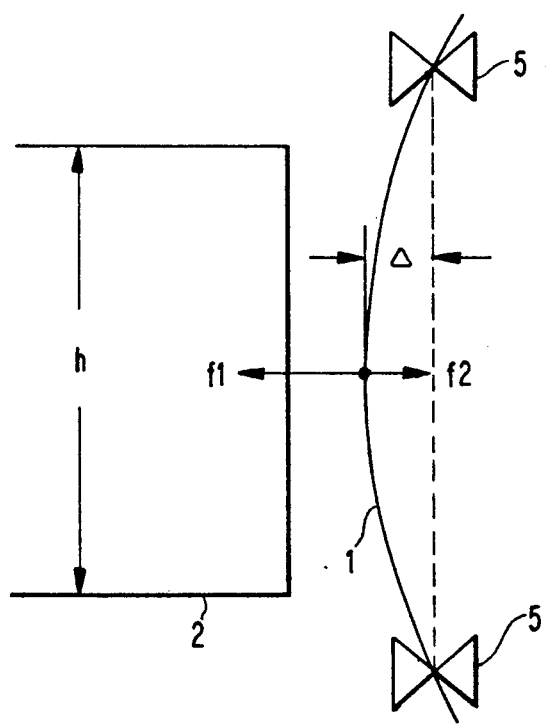
FIG. 4 explains the distortion occurring in the gap.

FIG. 4 is a model figure that is used to calculate the distortion δ of the wire electrode in the gap. In general, the distortion δ is calculated on the basis of the outside force f acting on the wire, $$\delta = fh^2/8T \quad (2)$$

where, h: workpiece thickness,
T: wire tension.

The distortion volume $\delta_1$ responsive to the electrostatic attractive force $f_1$ is calculated by substituting $f_1$ from equation (1) into the equation (2), and is shown by the dotted line in FIG. 2. Each of the full lines connected along with white circles, black circles, and white squares show the distortion volume δ attained by actual measurements according to the mean current variation.

The distortion volume for a small mean current (A) shows a value that is nearly equal to the calculated distortion volume (dotted line). According to an increase of the mean current (A→B→C), the full line shifts to the minus direction (to the direction that the concave shape volume decreases). The gradient of the straight lines A,B,C is constant and the same as that for the calculated electrostatic attractive force (dotted line).

This means that electrostatic attractive force $f_1$ and discharge repulsive force $f_2$ act on the wire in opposite directions. It is understood from FIG. 2 that as the mean current I becomes larger, the discharge repulsive force $f_2$ also becomes larger. Accordingly, the electrostatic force $f_1$ is canceled by the discharge repulsive force $f_2$.

From the above results, it is thought that the discharge repulsive force $f_2$ is substantially proportional to the mean current I. Therefore the discharge repulsive force $f_2$ is expressed as follows:

$$f_2 = kI \quad (3)$$

where k: proportional constant.

It is assumed that, during the finish machining, the discharge repulsive force $f_2$ and the electrostatic force $f_1$ act on the wire electrode in opposite directions. As a result, the composition of the two forces causes the distortion of the electrode and generates the arcuate shape.

An experiment carried out to confirm the above assumption made apparent several facts. First, during machining, an electrostatic force $f_1$ proportional to the mean voltage V and a discharge repulsive force $f_2$ proportional to the mean current I act on the wire electrode. The composition of the two forces act on the wire to make the distortion δ and to form the arcuate shape. Thus, if the discharge repulsive force $f_2$ is controlled to cancel the electrostatic force $f_1$, the distortion of the wire and the generation of the arcuate shape can be prevented. This theory is confirmed in practice.

Figure 1:
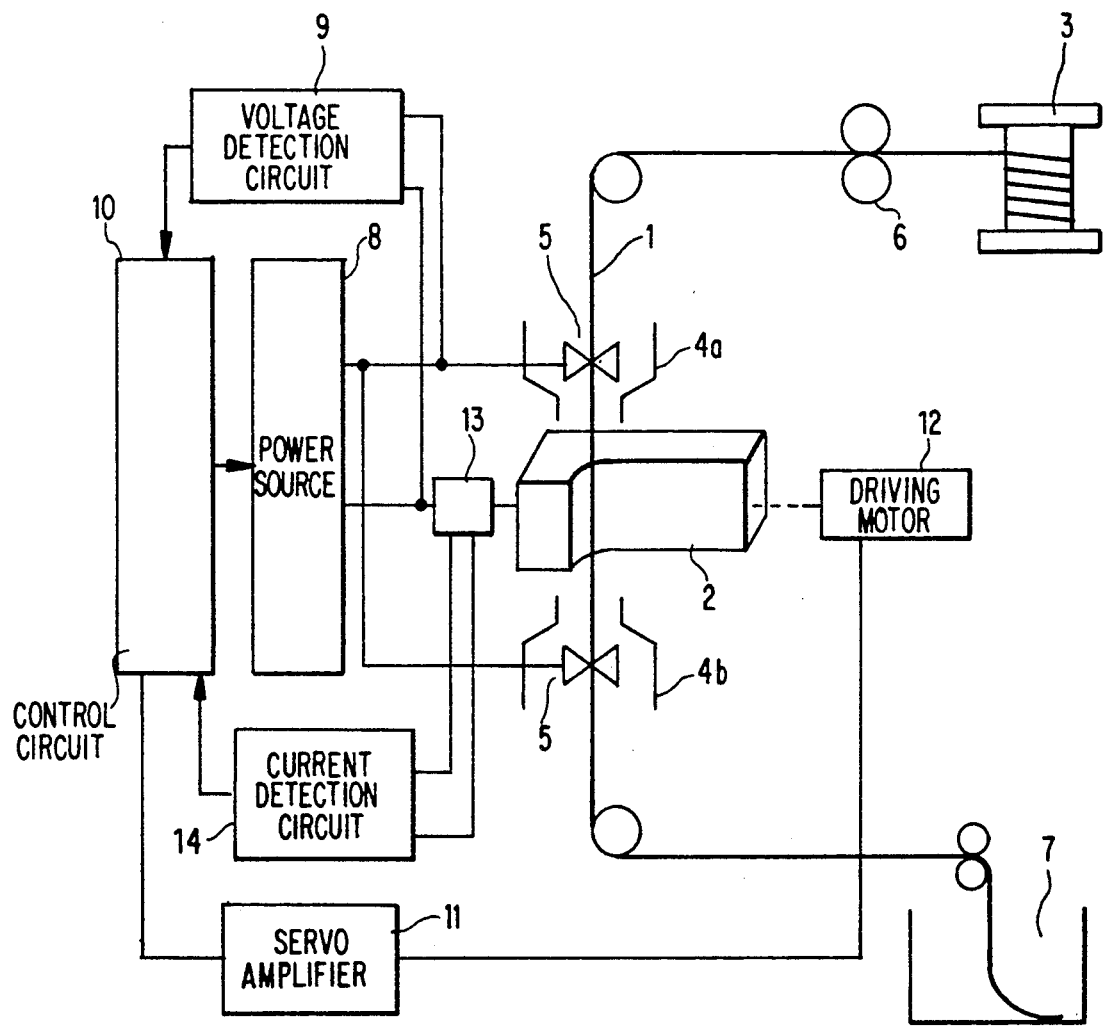
FIG. 1 is a block diagram of a wire-cut electric discharge machine embodying the present invention.

FIG. 1 shows a construction of a wire-cut electric discharge machine of the present invention. In FIG. 1, a wire electrode 1 provides one electrode for the electric discharge machining. A workpiece 2 is a material processed by the wire-cut electric discharge machine. A wire bobbin 3 provides a wire which acts as the wire electrode 1. Upper nozzle 4a and lower nozzle 4b provide dielectric working fluid into a discharge gap. A power supply having terminals 5 provides working voltage and working current. A tension roller 6 gives tension to the wire electrode 1. A wire collecting box 7 collects the worn wire. A working power source 8 provides current which flows within the discharge gap between the wire electrode 1 and the workpiece 2. A voltage detection circuit 9 detects the mean voltage at the discharge gap. A current probe 13 detects the current in the discharge gap. A current detection circuit 14 detects the mean current in the discharge gap. A control circuit 10 controls the feed rate of the workpiece 2 in response to the mean voltage detection circuit 9 and the current detection circuit 14. A servo amplifier 11 drives a driving motor 12. A driving motor 12 causes the workpiece 2, which is mounted on the X-Y cross table (not shown) to be moved in the X and Y direction.

Next, an operation of the present invention is explained hereinafter.

(1) Constant mean voltage control

The voltage detection circuit 9 connected between the electrodes detects mean voltage V during machining. And the detected voltage is controlled to be equal to the predetermined setting voltage.

If the detected mean voltage is larger than the setting voltage, it shows that the discharge gap distance has become larger. Therefore the control circuit 10 controls servo amplifier 11 so that the driving motor 12 increases the feed rate, and thus the removal rate, of the workpiece 2.

On the contrary, if the detected mean voltage is smaller than the setting voltage, it shows that the discharge gap has become smaller. Therefore the control circuit 10 controls the servo amplifier 11 so that the driving motor 12 decreases the feed rate (or removal rate) of the workpiece 2.

Figure 12:
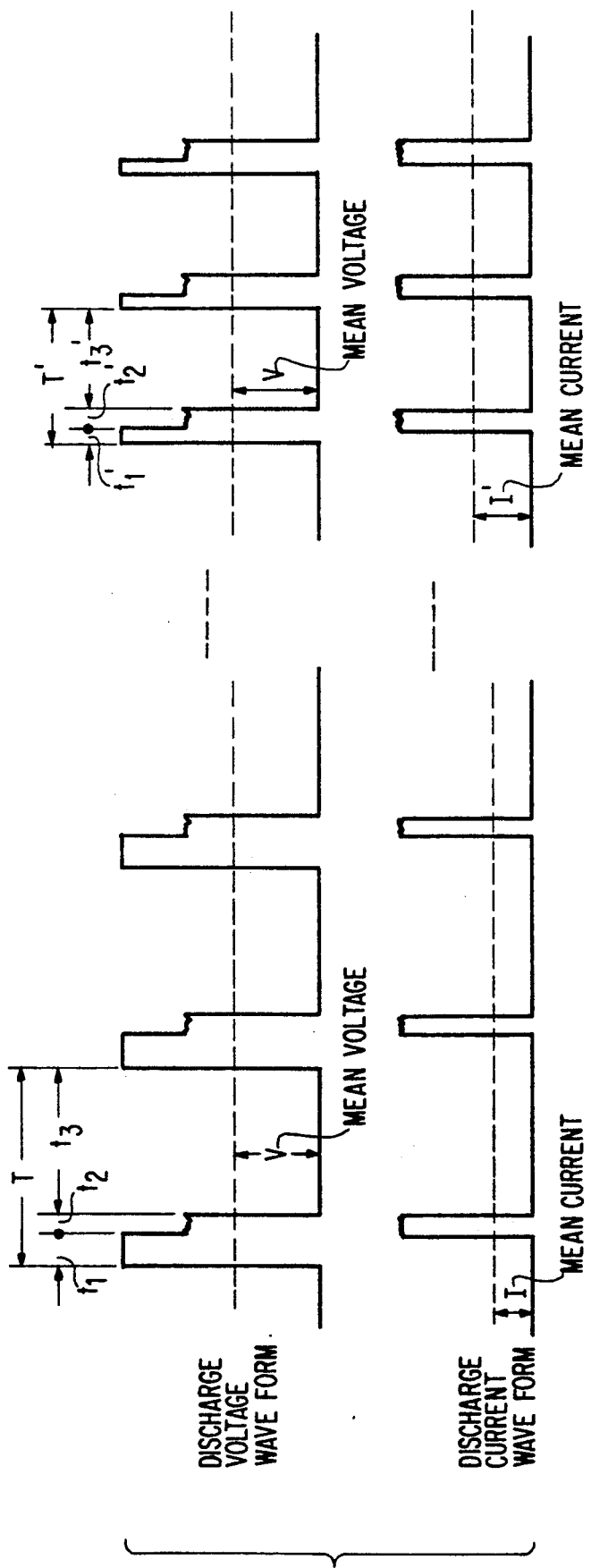
FIG. 12 shows the connection between the discharge current wave form and the discharge voltage wave form on the condition of constant mean voltage.

FIG. 12 shows the connection between the discharge voltage wave form and the discharge current wave form on the condition of a constant mean voltage. As shown in the figure, high discharge voltage is applied to the gap during on-time $t_1$. After the gap insulation breaks down, discharge current flows during $t_2$, and then the discharge ceases during off-time $t_3$. The period T of the discharge voltage is expressed such as $T = t_1 + t_2 + t_3$. In the figure, a mean voltage V is obtained by equalizing the discharge voltage for one or more periods. There are many well known methods to obtain the mean value of the discharge voltage. For example, there are the methods for changing the on-time and off-time ratio, changing the period of the pulse, or changing the amplitude of the pulse. In the figure, the discharge voltage is controlled so that the mean value becomes constant by changing the pulse period and the ratio of on-time and off-time. It is easily understood that the mean current increases by shortening the period of the discharge voltage. Generally, in accordance with the present invention, the voltage detection circuit 9 may detect an integral value of the discharge voltage, and the control circuit 10 may control the discharge voltage so that the detected integral value becomes equal to the predetermined value. The integral value may be an average, mean, medium or other integrated value.

(2) Constant mean current control

The current detection circuit 14 detects the mean current I during machining. And the detected current is controlled to be equal to the predetermined setting current.

If the mean current between the electrodes is smaller than the setting current, it shows that the discharge gap has become larger and discharge generation rate (discharge frequency) is lowered.

On the contrary if the mean current between the discharge electrodes is larger than the setting current, it shows that the discharge gap has become smaller and the discharge generation rate is increased.

Therefore the control circuit 10 controls servo amplifier 11 so that the driving motor 12 decreases the feed rate of the workpiece 2.

Figure 13:
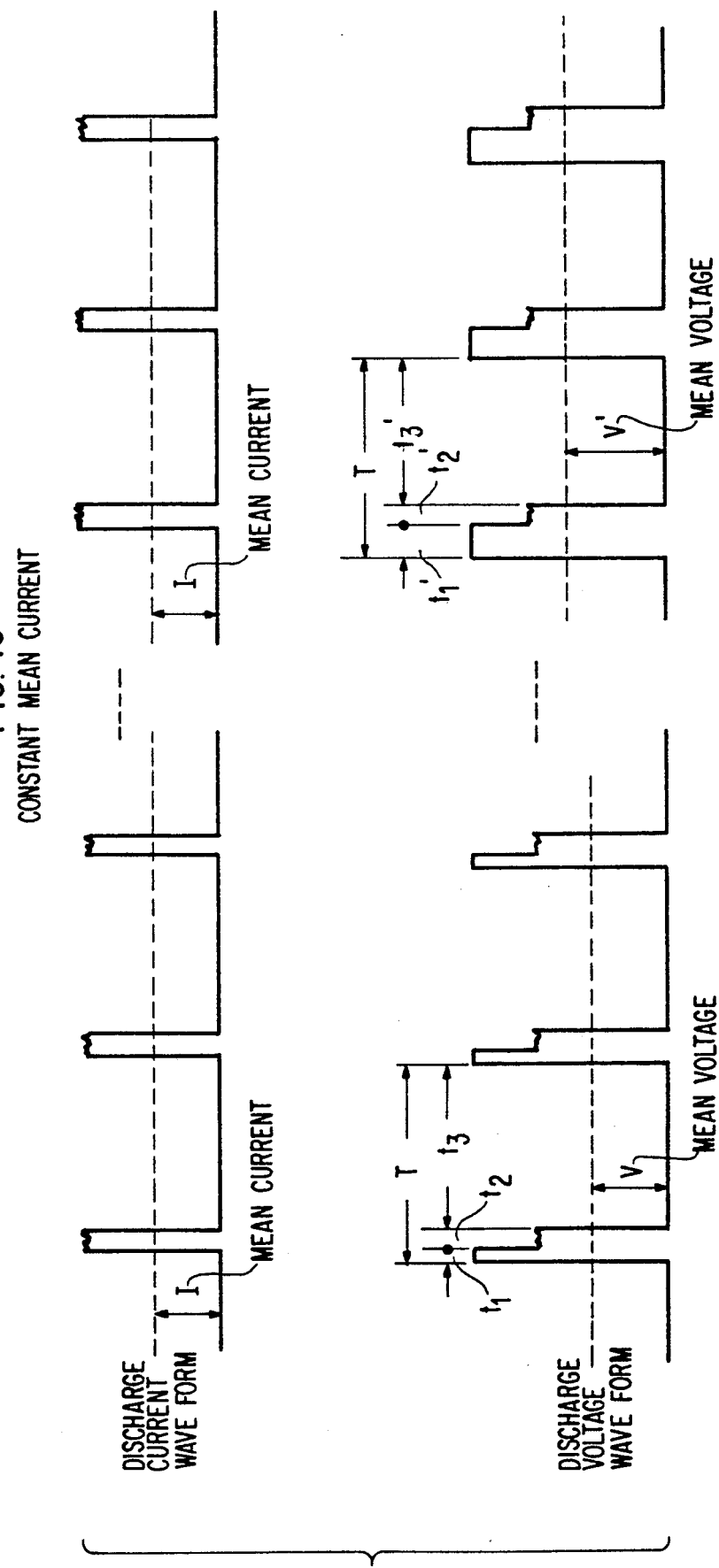
FIG. 13 shows the connection between the discharge current wave form and the discharge voltage wave form on the condition of constant mean current.

FIG. 13 shows the connection between the discharge current wave form and the discharge voltage wave form on the condition of a constant mean current. As shown in the figure, a high discharge voltage is applied to the gap during on-time $t_1$. In the figure, mean current I is obtained by equalizing the discharge current for one or more periods. The discharge current is controlled to be constant by controlling the pulse period to be constant. It is easily understood that the mean voltage increases by lengthening the period of on-time $t_1$ and shortening the period of off-time $t_2$. Generally, in accordance with the present invention, the current detection circuit 14 may detect an integral value of the discharge current, and the control circuit 10 may control the discharge current so that the detected integral value becomes equal to a predetermined value. This integral value may be an average, mean, medium or other integrated value.

In general, the initial working condition is selected so as to not generate an arcuate shape on the workpiece. But if the working piece thickness varies during machining, the balance between electrostatic attractive force $f_1$ and discharge repulsive force $f_2$ is lost and the wire electrode 1 causes a distortion having an arcuate shape.

For example, if the workpiece thickness becomes twice that of the first value, the electrostatic force $f_1$ per unit length does not change. But the distortion volume $\delta_1$ in response to the electrostatic attractive force $f_1$ becomes four times as large as shown in the equation (3), because $\delta_1$ is proportional to square of the workpiece thickness h as shown in equation (2), $$\delta_1 = f_1 \cdot (2h)^2/8T = 4f_1(h)^2/8T = 4\delta \qquad (3)$$

On the other hand if the workpiece thickness is doubled for a constant mean current, the discharge repulsive force $f_2$ per unit length becomes ½. Therefore the distortion volume $\delta_2$ in response to the discharge repulsive force $f_2$ is calculated from the equation (2), $$\delta_2 = (\tfrac{1}{2})f_2 \cdot (2h)^2/8T = 2f_2(h)^2/8T = 2\delta \qquad (4)$$

Therefore $\delta_1 = 2\delta_2$. As a result, the wire electrode is attracted to the surface of workpiece and the arcuate shape distortion occurs on the workpiece surface.

On the contrary, if the workpiece thickness becomes small during machining, the distortion $\delta_1$ in response to the electrostatic attractive force $f_1$ decreases. If discharge repulsive force $f_2$ becomes larger than the electrostatic attractive force $f_1$, the surface of the workpiece becomes convex in shape. The present invention controls mean current I and mean voltage V so that the electrostatic attractive force $f_1$ and the discharge repulsive force $f_2$ always maintain a balance.

An operation is explained hereinafter when the workpiece thickness is varied during the machining of a workpiece at a constant mean voltage.

At the condition of controlling the mean voltage V constant, if workpiece thickness varies during machining workpiece, the feed rate varies. As explained above if workpiece thickness is doubled, the feed rate becomes ½ under the condition of controlling the mean voltage to be constant.

The control circuit 10 detects the variation of workpiece thickness from the feed rate variation and controls work power source 8 which controls the off time of the machining pulse so that the mean current is doubled. Since the total discharge repulsive force $\Sigma f_2$ is proportional to the mean current, if the mean current is doubled then the total discharge repulsive force $\Sigma f_2$ is doubled. On the other hand, even if the workpiece thickness is doubled, the discharge repulsive force $f_2$ per unit length does not change.

But the distortion volume $\delta_2'$ is calculated from the equation (2) as follows:

$$\delta_2' = f_2(2h)^2/8T = 4f_2h^2/8T = 4\delta \qquad (5)$$

On the other hand, distortion volume $\delta_1$ in response to the electrostatic attractive force $f_1$ is calculated as shown in the above equation (3) such as;

$$\delta_1 = f_1 \cdot (2h)^2/8T = 4f_1(h)^2/8T = 4\delta \qquad (3)$$

Therefore $\delta_1 = \delta_2'$; the distortion volume $\Delta(=\delta_1-\delta_2)$ in response to the electrostatic attractive force $f_1$ and discharge repulsive force $f_2$ becomes equal and their balance is maintained.

Further, the current flowing in the discharge gap is detected by the current probe 13 and the mean current is detected by the current detection circuit 14. The detected mean current I is controlled by changing the off time of the discharge current.

FIGS. 5(a)-5(g) show dynamic characteristics of some portion of the wire-cut electric discharge machine when the workpiece thickness is varying under the condition of a constant mean voltage. The lateral axis in FIGS. 5 (a)-5(g) show time lapse.

FIG. 5(a) shows thickness variation of the workpiece.

FIG. 5(b) shows constant mean voltage.

FIG. 5(c) shows feed rate variation; feed rate is controlled so as to be inversely proportional to the workpiece thickness (As stated above, the removal rate can be used as an alternative to the feed rate).

FIG. 5(d) shows mean current variation;
mean current is controlled so as to be proportional to the workpiece thickness.

FIG. 5(e) shows variation of wire distortion volume $\delta_1$ in response to the electrostatic attractive force $f_1$; electrostatic attractive force $f_1$ is controlled so as to be proportional to the workpiece thickness h.

FIG. 5(f) shows variation of wire distortion volume $\delta_2$ in response to the discharge repulsive force $f_2$; discharge repulsive force $f_2$ is controlled so as to be proportional to the workpiece thickness h.

FIG. 5(g) shows the electrostatic attractive force f1 is canceled by the discharge repulsive force $f_2$ and then the wire distortion volume $\Delta(=\delta_1-\delta_2)$ becomes 0.

Next an operation is explained hereinafter when the workpiece thickness is varied during machining the workpiece under the condition of a constant mean current.

At the condition of controlling the mean current I constant, if workpiece thickness varies during machining workpiece, the feed rate varies. As explained above if workpiece thickness doubles the, feed rate becomes ½ at the condition of controlling the mean current constant.

The control circuit 10 detects the variation of workpiece thickness from the feed rate variation and controls work power source 8 which controls the off time of the machining pulse so that the mean voltage becomes ½. Since the total electrostatic attractive force $\Sigma f_1$ is proportional to the means voltage, if the means voltage becomes ½ then the total electrostatic attractive force $\Sigma f_1$ becomes ½.

On the other hand as the workpiece thickness is doubled, the distortion volume $\delta_1$, becomes;

$$\delta_1' = \frac{1}{2}f_1(2h)^2/8T = 2f_1h^2/8 = 2\delta \tag{5}$$

Therefore $\delta_1' = \delta_2$ and the distortion volume according to the electrostatic attractive force $f_1$ and discharge repulsive force $f_2$ becomes equal and their balance is maintained. Further the mean voltage of discharge gap is detected by the voltage detection detector 9. The detected mean voltage is controlled by changing the off time of the discharge voltage.

FIGS. 6(a)-6(g) show dynamic characteristics of some portion of the wire-cut electric discharge machine when the workpiece thickness is varying at the condition of constant mean current. The lateral axis in FIGS. 6(a)-6(g) show time lapse.

FIG. 6(a) shows thickness variation of the workpiece.

FIG. 6(b) shows constant mean current.

FIG. 6(c) shows feed rate variation; feed rate is controlled so as to be inversely proportional to the workpiece thickness (As stated above, the removal rate may also be used.)

FIG. 6(d) shows mean current variation; mean current is controlled so as to be proportional to the workpiece thickness.

FIG. 6(e) shows the variation of wire distortion volume $\delta_1$ according to the electrostatic attractive force; electrostatic attractive force $f_1$ is controlled so as to be proportional to the workpiece thickness h FIG. 6(f) shows the variation of wire distortion volume $\delta_2$ according to the discharge repulsive force $f_2$; the discharge repulsive force $f_2$ is controlled so as to be proportional to the workpiece thickness.

FIG. 6(g) shows the electrostatic attractive force and discharge repulsive force is canceled and the wire distortion volume $\Delta(=\delta 1 - \delta 2)$ becomes 0.

As explained above when the workpiece thickness varies, the electrostatic attractive force $f_1$ and the discharge repulsive force $f_2$ is canceled by controlling the mean current or mean voltage during the machining. Therefore, the electrostatic attractive force $f_1$ and the discharge repulsive force $f_2$ adjust the balance. Therefore the surface of the workpiece always becomes straight and as a result very high precision is attained.

Further in the condition of controlling the above mean voltage constant, corner shape precision is considerably improved.

Next, an operation regarding to the corner machining of the present invention is explained hereinafter.

Figure 7A:
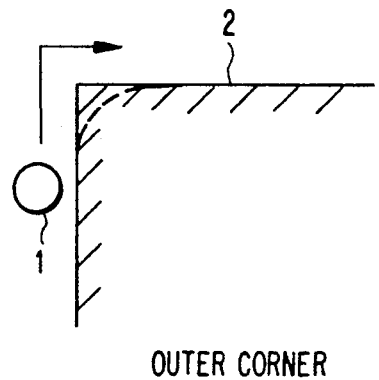
FIGS. 7(a) and (b) provide illustrations of corner machining.

FIG. 7(a) shows machining at the outward corner of the workpiece.

At the outward corner, the machining surface area becomes small and the feed rate increases. Therefore, in the conventional machining, the outward corner is usually cut down as shown by dotted line.

But according to the present invention the machining current decreases and off time is controlled to be longer. Therefore, the outward corner of the workpiece becomes sharp.

Figure 7B:
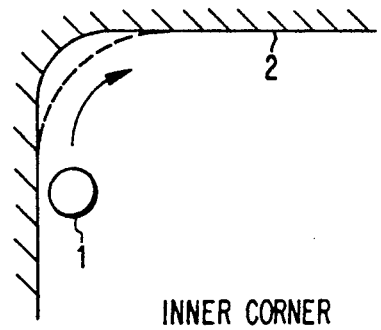
Figure 9A:
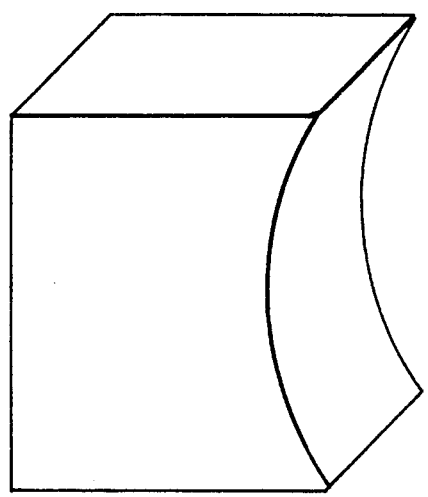
FIGS. 9(a) and (b) show some examples of arcuate shapes.
Figure 9B:
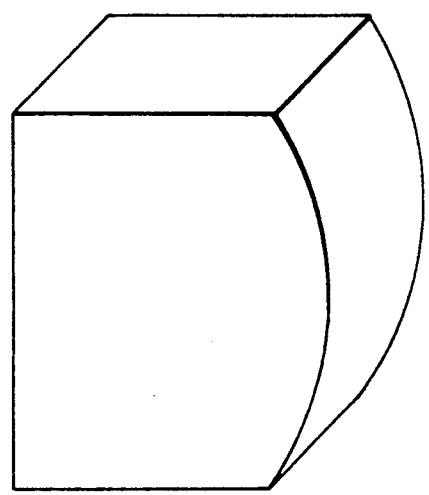
Figure 10A:
FIGS. 10(a) and (b) show the actual measurement result of the arcuate shape during machining.
Figure 10B:
Figure 8:
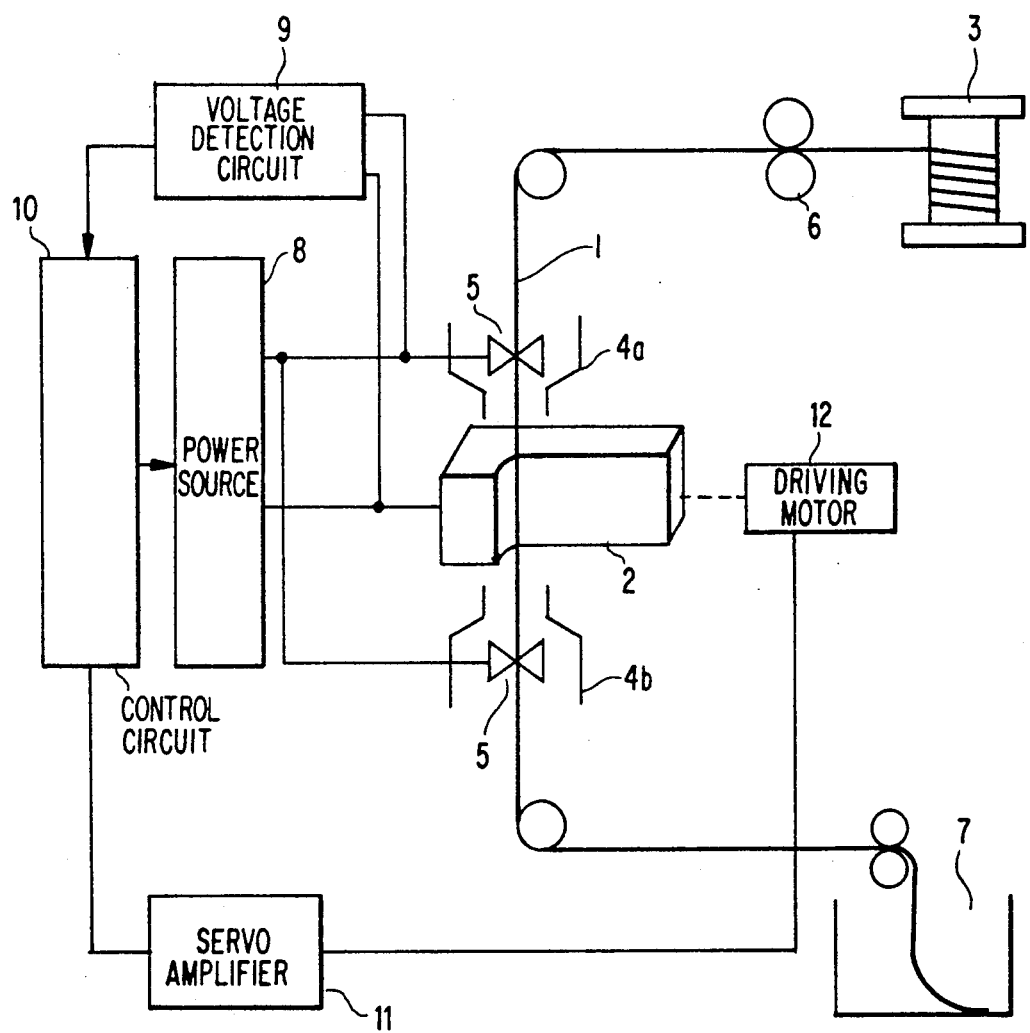
FIG. 8 is a block diagram of a conventional wire-cut electric discharge machine.

FIG. 7(b) shows machining at the inner corner of the workpiece. At the inner corner, the machining surface area becomes small and the feed rate decreases. Therefore, in the conventional machining, the inner corner is usually cut down as shown by a dotted line.

But according to the present invention the machining current increases and off time is controlled to be shorter. Therefore, the under cut of the inner corner is prevented.

In the above embodiments the mean voltage is controlled in proportion to the feed rate or mean current is controlled inversely proportional to the feed rate. But, the control is not restricted to the proportion or inverse proportion. Mean voltage and mean current may be controlled by suitable on-off pulse rate.

And further, instead of the current probe shunt, other current detection circuits constructed by using resistance may be employed.

What is claimed is:

1. A wire-cut electric discharge machine in which machining is carried out in a gap defined by wire electrode and workpiece, comprising:
   supply electrodes in electrical contact with said wire electrode;
   a working power source providing discharge current to said supply electrodes;
   a voltage detection means for detecting an integrated voltage value between said supply electrodes;
   a current detection means for detecting an integrated current value of said discharge current; and
   a control means for controlling said integrated current detected by said current detection means so as to increase or decrease the value thereof in response to the variation of the feed rate of the workpiece.

2. A wire-cut electric discharge machine of claim 1, wherein said control means controls said integrated current detected by said current detection means so as to be inversely proportional to the variation of the feed rate of the workpiece.

3. The machine of claim 1, wherein said control means controls said integrated voltage to be a predetermined value.

4. The machine of claim 3, wherein said predetermined value is a constant value.

5. A wire-cut electric discharge machine of claim 1, wherein said control means controls said integrated voltage detected in said voltage detection means so as to be proportional to the variation of the feed rate of the workpiece.

6. A wire-cut electric discharge machine in which machining is carried out in a gap defined by wire electrode and workpiece, comprising:
   supply electrodes in electrical contact with said wire electrode;
   a working power source for providing discharge current to said supply electrodes;
   a voltage detection means for detecting an integrated voltage value between said supply electrodes;
   a current detection means for detecting an integrated current value of said discharge current; and a control means for controlling said integrated current to be a predetermined value and also for controlling said integrated voltage detected in said voltage detection means so as to increase or decrease the value thereof in response to the variation of the feed rate of the workpiece.

7. The machine of claim 1 or 6, wherein said integrated value is one of an average, median or mean value.

8. The machine of claim 1 or 3, wherein said integrated values are mean values.

9. The machine of claim 6, wherein said predetermined value is a constant value.

10. The machine of claim 1 or 6, wherein said control means is operative to change at least the pulse period of the discharge current.

11. The machine of claim 1 or 6, wherein said control means is operative to change the on-off pulse rate of the discharge current.

12. A method of machining a workpiece using a wirecut electric discharge machine, having a power source for providing a discharge current to a wire electrode and enabling a discharge across a gap defined by the electrode and the workpiece, the method comprising the steps of:

(a) detecting at least one of an integrated discharge current value and the integrated discharge voltage value across the gap; and (b) maintaining the electrostatic attractive force and the discharge repulsive force at the gap at substantially equal but opposite values controlling one of the integrated current and voltage values at the gap, wherein the electrostatic attractive force is proportional to the integrated voltage value and the discharge repulsive force is proportional to the integrated current value.

13. The method of claim 12, wherein the off time of the discharge current is adjusted to control the detected mean discharge current values.

14. The method of claim 12, wherein the off time of the discharge voltage is adjusted to control the detected mean discharge voltage values.

15. The method of claim 12, wherein the maintaining step further comprises controlling at least one of the mean discharge current and mean discharge voltage to be equal to a predetermined value.

16. The method of claim 15, wherein said controlling step is preformed in proportion to a removal rate.

17. The method of claim 16, wherein said control is operative by variation of on-off pulse rate.

18. The method of claim 15, wherein said predetermined value is constant.

19. The method of claim 15, wherein said control is in proportion to the thickness of the workpiece.

20. The method of claim 15, wherein both current and voltage are controlled in response to variation in removal rate.

* * * * *